United States Patent [19]
Alberty et al.

[11] 3,895,914
[45] July 22, 1975

[54] MEANS FOR ISOLATION AND DETECTION OF BARBITURIC ACID DERIVATIVES AND GLUTETHIMIDE IN BIOLOGICAL FLUIDS

[75] Inventors: Joachim Alberty, Helsinki; Eero Salomaa, Kauklahti; Nils-Erik Saris, Helsinki; Eero Sjöström, Kauniainen; Gabriel Zewi, Tapiola, all of Finland

[73] Assignee: Orion-Yhtymä OY, Helsinki, Finland

[22] Filed: Jan. 31, 1973

[21] Appl. No.: 328,336

[30] Foreign Application Priority Data
Feb. 2, 1972 Finland .................................. 319/72

[52] U.S. Cl. ............. 23/253 TP; 23/230 B; 252/408
[51] Int. Cl. ...................... G01n 21/06; G01n 33/16
[58] Field of Search ...... 23/230 B, 253 TP; 252/408

[56] References Cited
UNITED STATES PATENTS

| | | | |
|---|---|---|---|
| 3,235,337 | 2/1966 | Artis ............................... | 23/253 TP |
| 3,275,416 | 9/1966 | Zaar .................................... | 23/230 B |
| 3,359,180 | 12/1967 | Evans............................... | 23/253 TP |
| 3,511,608 | 5/1970 | Anderson.......................... | 23/253 TP |
| 3,616,258 | 10/1971 | Kronish..................... | 23/255 TP UX |
| 3,699,003 | 10/1972 | Kronish........................ | 23/253 TP X |

Primary Examiner—Morris O. Wolk
Assistant Examiner—Sidney Marantz
Attorney, Agent, or Firm—V. Alexander Scher

[57] ABSTRACT

A test strip, for the detection of barbituric acid, barbituric acid derivatives and glutethimide in biological fluids, having three contiguous zones. The first zone is acid impregnated; the second zone is impregnated with alkaline buffered mercuric acetate; the third zone is impregnated with diphenyl carbazone. The three zones may be separated by two unimpregnated intermediate zones.

3 Claims, 3 Drawing Figures

MEANS FOR ISOLATION AND DETECTION OF BARBITURIC ACID DERIVATIVES AND GLUTETHIMIDE IN BIOLOGICAL FLUIDS

The object of the present invention is a means for isolation and detection of barbituric acid derivatives (barbiturates) and glutethimide in biological fluids, for a method wherein a mercury compound, a mercury indicator reagent and solvent are used. In cases of intoxication delivered into treatment, intoxication by hypnotics happens comparatively often, and in that case it is usually intoxication caused by excessive ingestion of barbiturates. It is in such cases eminently important for the treating physician to find out without delay whether or not the patient has taken barbiturates so that he may undertake proper therapeutic measures.

The analysis methods available at present for establishing barbiturates in biological fluids, such as urine, serum or blood, are time-consuming and cumbersome. They are based on extraction of barbiturates from the body fluids and subsequent chemical detection. The methods in present use mostly require the resources of a well-equipped laboratory.

To be sure, a method is known which is intended for rapid demonstration and determination of barbiturates in urine or serum (U.S. Pat. No. 3,275,416), in principle outside any laboratory. This method is based on formation of a barbiturate-mercury complex and detection and determination of mercury in this complex. However, the apparatus by which detection of barbiturate is carried out has a so complicated design that its use is expensive if it is used on a discardable, single-use basis. If, again, the apparatus is repeatedly used, its charging is cumbersome and time-consuming.

As a result of the present invention, a simple and inexpensive, and rapid and reliable, discardable means for detection of barbiturates has been achieved. The invention is characterized in that the means consists of a strip made of a porous material, for instance of paper, having the following zones impregnated with chemicals, counted from one end of the strip: in the first zone, a chemical acidifying the fluid to be examined, e.g., potassium dihydrogenphosphate; in the second zone, a mercury compound, e.g., buffered mercuric acetate; and in the third zone, a mercury-indicating reagent, e.g., diphenyl carbazone; and of a tube from which solvent is absorbed into the strip placed in this tube, in which solvent the barbituric acid derivatives and their mercury compounds are soluble.

The above-mentioned zones are separated by zones not treated with any chemicals. The said strip should preferably consist of filter paper, e.g., Whatman No. 17 filter paper. The zone 1 in the paper strip may be impregnated with a 0.4% aqueous solution of potassium dihydrogenphosphate, zone 2 with a solution containing 0.6 percent tris buffer in methanol and to which solution 0.2 percent of mercuric acetate have been added, and the third zone with a solution of 0.02 percent diphenyl carbazone in chloroform.

Since the means according to the invention consists of a paper strip having zones impregnated with given chemicals, it follows that the means is as simple and inexpensive as can ever be conceived and, therefore, eminently suitable for use as a discardable means. Furthermore, the test is easily and rapidly performed. Briefly said, the test is carried out by absorbing the fluid to be examined into the acidifying zone at one end of the paper strip and by wetting the central, alkaline mercury salt zone with water. The paper strip is placed in the tube with its end, impregnated with the fluid to be examined, ahead. The tube contains a small quantity of a solvent. After the solvent has ascended, along the strip, up to the uppermost zone, one ascertains by inspection whether the colour of this zone has turned blue. If this is observed, then the fluid examined contains barbiturates.

The invention is described in greater detail with reference to the attached drawing. In the drawing, FIG. 1 presents a means according to the invention, seen from the front.

Figure 1:
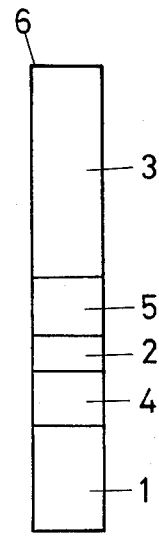

The paper strip shown in FIG. 1 has the size 77 × 10 mm. Said strip 6 has the following zones containing different chemicals. The lowest zone 1 has a length of about 18 mm. It is impregnated with a 0.4 percent aqueous solution of potassium dihydrogenphosphate ($KH_2PO_4$). Over said zone lies an intermediate zone 4, about 10 mm long, which is unimpregnated. Over this intermediate zone lies zone 2, about 6 mm long. This has been impregnated with alkaline mercuric acetate solution. This impregnating solution contains 0.2 percent of mercuric acetate and 0.6 percent of tris buffer (tris-(hydroxymethyl)-aminomethane) in methanol. Above the aforementioned zone 2 lies a zone 5, about 10 mm long, which is unimpregnated. Above this there is a zone 3, about 33 mm long, which has been impregnated with a solution of 0.02 percent diphenyl carbazone in chloroform. The strip is ready to be used after the solvents have evaporated. Such test strips can be produced industrially.

Figure 2:
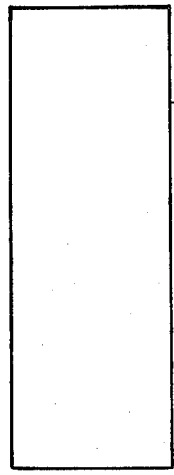
FIG. 2 shows the tube used in the examination, seen from the front.
Figure 3:
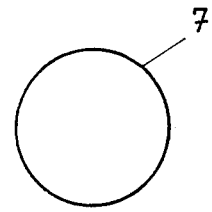
FIG. 3 shows the cross section of the tube of FIG. 2.

The tube seen in FIGS. 2 and 3 has been made of a transparent material, e.g., of glass, and it has a height of about 60 mm and about 25 mm diameter. This tube 7 is intended for solvent.

Demonstration of barbiturates in urine is accomplished as follows.

The sample to be examined is absorbed into the zone 1, impregnated with potassium dihydrogenphosphate, of the strip 6. It is important to effect wetting over the entire width of the strip.

The zone 2, containing tris buffer and mercuric acetate, is wetted with pure water. It is important, in this instance too, that the wetting is effected over the entire width of the strip.

The strip 6 is then placed standing in the small tube 7, into whose bottom a layer, about 5 mm high, of a solvent has been poured. This solvent may be, for instance, a mixture containing chloroform, 80 parts by volume, and benzyl alcohol, 20 parts by volume. When the chloroformbenzyl alcohol mixture ascends in the strip 6, the barbiturate is solved in it and travels along with the solvent into zone 2 containing alkaline mercuric acetate, whereby a mercury compound of the barbiturates is formed. This is soluble in the chloroform-benzyl alcohol mixture and travels along with the solvent into zone 3, containing diphenyl carbazone, of the strip 6. Here a diphenyl carbazone compound of mercury is formed, which is observed by its blue colour.

When it is desired to demonstrate barbiturate in blood or serum, the test is performed otherwise in identical manner, except that the blood or serum sample, which has been absorbed into the potassium dihydrogen-phosphate-impregnated zone 1 of the test strip, is subsequently wetted with acetone. The acetone is allowed to evaporate from the strip at room temperature, whereupon the test is continued as has been described in the foregoing. The acetone treatment described precipitates proteins of blood and serum and, at the same time, increases the specificity of the test.

When experiments were performed with aqueous solutions of different barbiturates, the sensitivity limits of the reaction presented in Table 1 were observed.

Table 1

| Barbiturate | Concentration, mg/l | |
|---|---|---|
| 5-allyl-5-(1-methylbutyl)barbituric acid | 10 – 20 (+) | 30 + |
| 5-allyl-1-methyl-5-(1-methyl-pent-2-ynyl)-barbituric acid, sodium salt of | 20 – 40 (+) | 50 + |
| 5-butyl-5-ethylbarbituric acid | 10 (+) | 20 + |
| 5,5-diethylbarbituric acid | 20 – | 30 + |
| 5-ethyl-5-sec.-butylbarbituric acid, sodium salt of | 20 (+) | 30 + |
| 5-ethyl-5-phenylbarbituric acid | 10 (+) | 20 + |
| 5-ethyl-5-isoamylbarbituric acid | 10 (+) | 20 + |
| 5-ethyl-5-(1-methylbutyl)barbituric acid | 10 (+) | 20 + |
| 5-ethyl-5-(1-methylbutyl-2-thiobarbituric acid, sodium salt of | 10 – 30 (+) | 40 + |
| 5-ethyl-5-phenyl-1-methylbarbituric acid | 20 – 30 (+) | 40 + |
| 5-ethyl-5-(1-cyclohexenyl)barbituric acid | 10 (+) | 20 + |

− negative result
(+) weak positive result
+ positive result

One may conclude, based on the sensitivity limits seen in the above table, that the demonstration method is sensitive enough for demonstrating barbiturates in cases of intoxication. If a negative reaction is obtained, it is obvious that the patient has no such amount of barbiturates in his body fluids which would cause any serious intoxication.

Except with barbiturates, the reaction also yields a positive result with glutethimide (2-ethyl-2-phenylglutaric acid imide), which is equally used as a hypnotic, at concentrations in excess of 20 mg/l.

The invention is by no means restricted to the example presented in the foregoing. For instance, the paper strip may have another size than that specified above, and it may be replaced with another porous material fitting the purpose in hand. It is also possible to substitute for potassium dihydrogenphosphate another acidifying substance. Furthermore, one may use as mercury reagent another mercury salt, and as mercury indicating reagent another mercury indicating reagent, than those mentioned above. One may also use as solvent a solvent containing other substances than those mentioned.

We claim:

1. A test strip for the detection of barbituric acid, barbituric acid derivatives and glutethimide in biological fluids comprising a bibulous paper strip having consecutive chemically-impregnated zones sequentially identified from one end of said strip as follows:
   a. a first zone impregnated with an acid for acidifying a sample of the biological fluid being tested,
   b. a second zone impregnated with alkaline buffered mercuric acetate, and
   c. a third zone impregnated with diphenyl carbazone.

2. The test strip of claim 1, wherein the first zone is impregnated with potassium dihydrogen phosphate and wherein the second zone is impregnated with tris-(hydroxymethyl)-aminoethane and mercuric acetate.

3. The test strip of claim 1, wherein the three impregnated zones are separated by two intermediate unimpregnated zones.

* * * * *